United States Patent
Mattes et al.

(10) Patent No.: US 7,302,602 B2
(45) Date of Patent: Nov. 27, 2007

(54) CONTROL UNIT

(75) Inventors: Bernhard Mattes, Sachsenheim (DE); Siegfried Malicki, Ingersheim (DE); Holger Lange, Walddorf-Haeslach (DE); Klaus Ott, Nehren (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 10/575,314

(22) PCT Filed: Jul. 22, 2004

(86) PCT No.: PCT/DE2004/001622

§ 371 (c)(1),
(2), (4) Date: Apr. 10, 2006

(87) PCT Pub. No.: WO2005/045543

PCT Pub. Date: May 19, 2005

(65) Prior Publication Data

US 2007/0132516 A1   Jun. 14, 2007

(30) Foreign Application Priority Data

Oct. 8, 2003   (DE) ................. 103 46 621

(51) Int. Cl.
  *G06F 1/04*   (2006.01)
  *H03B 1/00*   (2006.01)
(52) U.S. Cl. .......................... 713/500; 331/64
(58) Field of Classification Search ............... 713/500; 331/64, 173
See application file for complete search history.

(56) References Cited

U.S. PATENT DOCUMENTS

| 4,687,622 | A | 8/1987 | Longden et al. |
| 5,107,245 | A | 4/1992 | Gesper et al. |
| 5,119,295 | A | 6/1992 | Kapur et al. |
| 2007/0132516 | A1* | 6/2007 | Mattes et al. ............. 331/16 |

FOREIGN PATENT DOCUMENTS

EP    0 277 767    8/1988

\* cited by examiner

*Primary Examiner*—David Mis
(74) *Attorney, Agent, or Firm*—Kenyon & Kenyon LLP

(57) ABSTRACT

A control unit having an oscillator for a processor is described, the control unit storing a temporary absence of oscillation of the oscillator in a first error memory, if oscillation begins again after the absence.

9 Claims, 2 Drawing Sheets

CONTROL UNIT

FIELD OF THE INVENTION

The invention is generally directed to a control unit having an oscillator for a processor (μC).

SUMMARY OF THE INVENTION

The invention provides a control unit having an oscillator for a processor (μC), the control unit being configured so that the control unit stores a temporary absence of oscillation of the oscillator in a first error memory (15), if oscillation begins again after the absence.

The control unit according to the invention has the advantage that when temporary interruptions occur in the oscillations of an oscillator for a processor in a control unit, these interruptions, which may occur for example due to temperature dependencies or shunt resistances in the oscillator circuit, are stored in an error memory. In particular, this avoids unnecessary visits to the repair shop which a customer would have made in response to a brief illumination of the warning lamp, the shop then not being able to determine why the warning lamp was activated.

The control unit according to the present invention makes it possible to write this error to a permanent error memory of the control unit. This improves the possibilities for servicing control units, in particular in the case of airbag triggering devices. Oscillators which are temporarily not oscillating are identified, and these errors are stored in the memory.

BRIEF DESCRIPTION OF THE DRAWINGS

The invention will be described in greater detail with reference to the following drawings wherein.

DETAILED DESCRIPTION OF THE INVENTION

Figure 1:
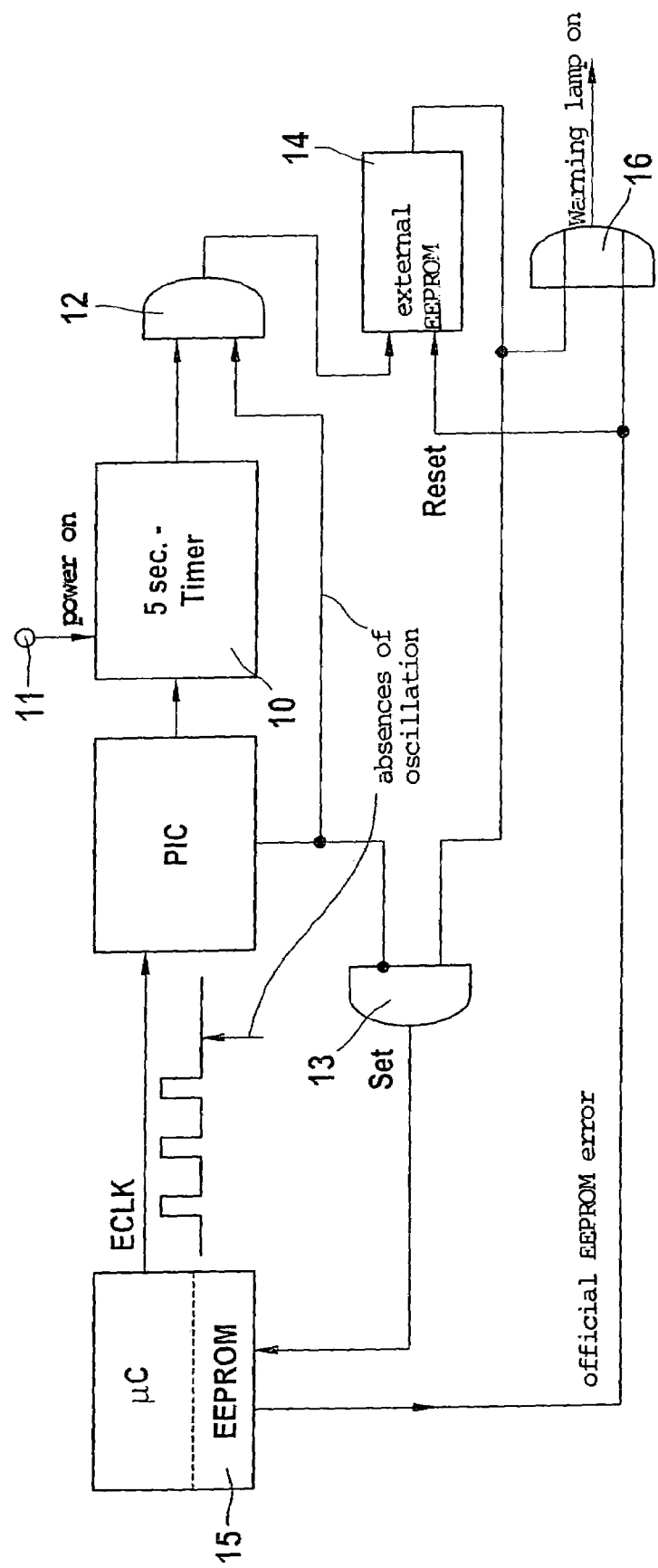
FIG. 1 shows a block diagram of the control unit according to the present invention.

It is especially advantageous that the control unit has a logic module which, when oscillation is absent, sets a second error memory to a predefined state; the logic module then stores the absence in the first error memory depending on the state of the second memory. That solves the problem that the microprocessor or microcontroller in the control unit does not work if the oscillation of the oscillator is absent. Consequently it is not possible to write to the memory assigned to the processor, i.e. a rewritable memory, for example an EEPROM. A second error memory is therefore proposed, which is set to a predefined state by a simple logic circuit depending on the absence of the oscillation. This state indicates the error that oscillation failed at least temporarily, or that its amplitude was too small to clock the connected ASICs reliably. If oscillation begins again, the microprocessor is able to write the error message that an absence of oscillation has occurred to the first error memory assigned directly thereto as a function of the state of the second error memory. This simplifies the identification of such errors significantly.

It is also advantageous that a timer module is assigned to the logic module in such a way that after a predetermined time after the supply voltage is switched on, determined by the timer module, the second error memory is set to the state in which the error is indicated. That advantageously prevents the clock oscillator from having sufficient time after power-up, e.g. 5 seconds, to begin oscillating. During subsequent operation, this blocked timer is non-functional, so that even short interruptions result in an entry in the error memory and possibly in activation of a warning lamp.

Moreover, it is advantageous that the control unit resets the second memory after oscillation begins again, since the error message, which may then be read out, is then written to the memory which is assigned to the microprocessor. Now the external memory is again usable for a new error; it may therefore be designed in a simple manner in order to be set to the particular state by a simple logical signal 0 or 1.

Finally, it is also advantageous that the logic module continues to generate a signal that identifies the absence of oscillation until the first error memory is read. For example, this signal may activate the warning lamp until the error memory is read. At the same time, it may also be required for the error message to be deleted after being read in order to ensure that the warning lamp is turned off.

In electronic control units, an oscillator is necessary for the processor or microcontroller to function. This oscillator produces the clock cycle or cycles with which the processor and the connected components operate. It is possible that the oscillator, for example a Pierce crystal oscillator, does not begin to oscillate after the power is turned on. Also, during operation there may already be sporadically occurring interruptions in the oscillation signal of the oscillator, or decreases in the amplitude of the oscillation signal which are incompatible with the connected components. The problem in this context is to identify and store this error, so that the repair shop is able to identify the error in order to ultimately correct it.

According to the present invention, it is proposed that this temporary absence be stored in a first error memory, i.e., an EEPROM assigned directly to the microcontroller, if the oscillation will begin again after the interruption. This is preferably achieved by a logic module setting an external EEPROM, and depending on this setting writing the message that there was an oscillation interruption to the first error memory when oscillation begins again. That enables the error to be retrieved for inspection. The logic module may use a timer, which determines the minimum time by which oscillation must have begun after the power supply is turned on in order to justify an entry in the error memory. This value may be 5 seconds, for example. This second memory, which is switched back and forth between two states, is reset after oscillation begins again, in order to be ready to indicate another error. Advantageously, provision is made for a warning lamp to remain illuminated until the error has been read from the error memory and possibly deleted.

FIG. 1 shows a block diagram of the construction of the control unit, omitting all components which are not necessary to explain the invention. A microcontroller μC transmits its clock signal ECLK to a module PIC, clock signal ECLK having been generated on the basis of a signal from an oscillator, for example a Pierce crystal oscillator. Assigned to microcontroller μC is a rewritable memory 15, designed here in the form of an EEPROM. This is a memory which is rewritable. This memory is made up of transistor structures. Module PIC stands for Peripheral Interface IC. Module PIC generates a logic signal based on interruptions in the clock signal or on excessive decreases in amplitude of the clock signal. A timer module 10 is connected to the power supply via connector 11. Hence oscillation must be present 5 seconds after power-up to prevent identification of an error. If not, an error is present. Depending on this test, timer 10 delivers a logical output signal to a first inverting input of an AND gate 12. The output signal of the PIC module, i.e., whether or not there is an absence of oscillation, is applied to a second input of AND gate 12. If both timer 10 and module PIC show that oscillation is absent at least 5 seconds after the supply voltage is turned on, an external memory module 14 which is also in the form of an EEPROM is set to a predefined state by the output signal of AND gate 12. Therefore if both timer module 10 and module PIC indicate that oscillation is absent, AND gate 12 sets EEPROM 14 to a predefined state. Memory 14 may be reset via an output signal from memory 15. This occurs if the oscillation absence error has been stored in internal memory 15 of µC, no more oscillation absences occur, and microcontroller µC functions normally. The second output signal from module PIC is given not only to AND gate 12, but also to an AND gate 13, namely to the latter's inverting input. The output signal from memory 14 is applied to a second input of AND gate 13. If memory 14 shows oscillation to be absent and module PIC does not, so that oscillations are occurring again and microcontroller µC is functioning, memory 15 is activated so that an error message is written to the effect that a temporary interruption in the oscillation of the oscillator has occurred. The output signal from memory 14 is also applied to a first input of an OR gate 16, so that if memory 14 is set to show that an oscillation interruption has occurred, the output signal from OR gate 16 is in any case a logical 1 so that a warning lamp is activated. The error bit of memory 15 is connected to a second input of OR gate 16, i.e., the warning lamp is also activated if memory 15 also recognizes that there was an error.

Figure 2:
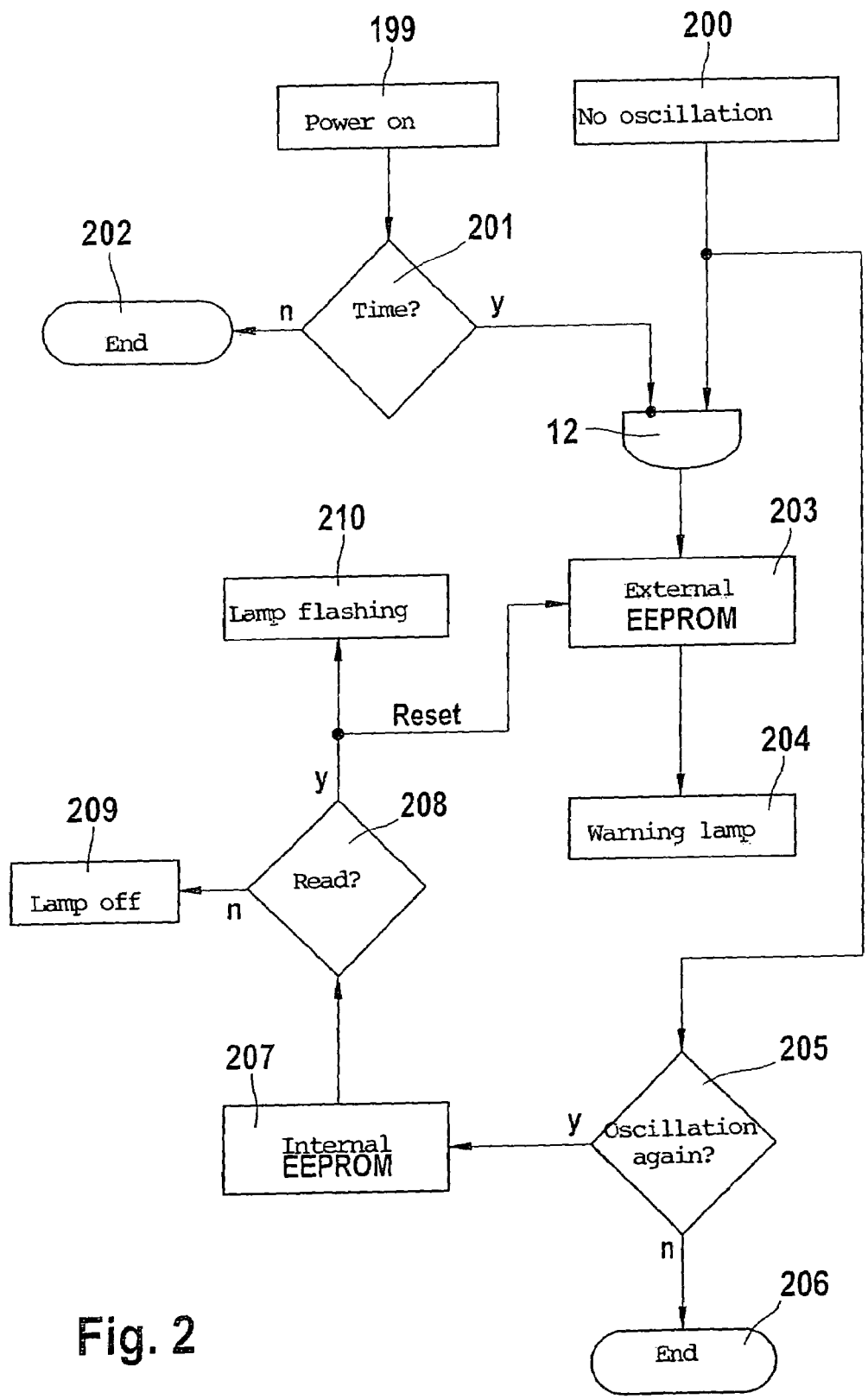
FIG. 2 shows a flow chart explaining the function of the control unit.

FIG. 2 explains in a flow chart the function of the control unit. In procedural step 199, the power-up of the supply voltage is detected and timer 201 is started. Procedural step 200 determines that an oscillation interruption has occurred. Procedural step 201 tests whether this persists until 5 seconds after the start of the supply voltage. If not, the procedure ends in procedural step 202. But if so, memory 14 is set in procedural step 203 via the logic module from modules PIC 10 and 12 to the state in which an oscillation interruption has occurred. In addition, the warning lamp is activated in [procedural step] 204 via module 16. Procedural step 205 tests whether oscillation has again begun. If not, the warning lamp remains on and the procedure ends in procedural step 206. But if so, the error message is written in procedural step 207 to the internal EEPROM 15 of microcontroller µC via module 13. This error message is already prepared and is loaded into the memory as a function of the output signal of AND gate 13. Procedural step 208 tests whether or not it was possible to read the error message in memory 15. If this is the case, the warning lamp is left on in procedural step 210. If this is not the case, the lamp is deactivated in procedural step 209. This occurs in particular due to the fact that no error message was present in memory 15. That eliminates the error bit, and only logical zeros remain at the inputs of OR gate 16.

In particular in the case of brief interruptions which occur during operation, timer 10 must be ineffectual, since it ensures that sufficient time is made available during the power-up period for oscillation to begin and no error is stored.

On the basis of the description of the present invention, it is clear to a person skilled in the art that the exemplary embodiment shown in FIG. 1 may be varied, while still implementing the present invention. In particular, the nature and placement of the error memories may be modified.

What is claimed is:

1. A control unit having an oscillator for a processor (µC), the control unit being configured so that the control unit stores a temporary absence of oscillation of the oscillator in a first error memory (15), if oscillation begins again after the absence.

2. The control unit according to claim 1, wherein the control unit has a logic module (PIC, 10, 12, 13) which, when oscillation is absent, sets a second error memory (14) to a predefined state, the logic module storing the absence in the first error memory (15) as a function of the state of the second error memory (14) and the resuming of oscillation.

3. The control unit according to claim 2, wherein a timer module (10) is assigned to the logic module in such a way that after a predefined time after the supply voltage is turned on, the second error memory (14) is set to the state if the oscillation is then still absent.

4. The control unit according to claim 2, wherein the control unit is configured in such a way that the control unit resets the second memory (14) after oscillation has begun again.

5. The control unit according to claim 3, wherein the control unit is configured in such a way that the control unit resets the second memory (14) after oscillation has begun again.

6. The control unit according to claim 2, wherein the logic module continues to generate a signal that identifies the absence of oscillation until the second error memory is reset.

7. The control unit according to claim 3, wherein the logic module continues to generate a signal that identifies the absence of oscillation until the second error memory is reset.

8. The control unit according to claim 4, wherein the logic module continues to generate a signal that identifies the absence of oscillation until the second error memory is reset.

9. The control unit according to claim 5, wherein the logic module continues to generate a signal that identifies the absence of oscillation until the second error memory is reset.

* * * * *